United States Patent [19]

Wrobel et al.

[11] Patent Number: 4,537,068
[45] Date of Patent: Aug. 27, 1985

[54] THERMAL ANEMOMETER

[75] Inventors: Stanley A. Wrobel, Harbert; Robert G. Ashton, Waterveliet, both of Mich.

[73] Assignee: Dwyer Instruments, Inc., Michigan City, Ind.

[21] Appl. No.: 474,043

[22] Filed: Mar. 10, 1983

[51] Int. Cl.³ .............................................. G01F 1/68
[52] U.S. Cl. ........................................ 73/202; 73/204
[58] Field of Search ................................. 73/204, 202

[56] References Cited

U.S. PATENT DOCUMENTS

| | | | |
|---|---|---|---|
| 2,800,018 | 7/1957 | Phillips et al. | 73/204 |
| 3,372,590 | 3/1968 | Sterling | 73/204 |
| 3,433,068 | 3/1969 | Werner et al. | 73/204 |
| 4,070,908 | 1/1978 | Newell | 73/204 X |
| 4,193,300 | 3/1980 | Peter | 73/204 |
| 4,413,514 | 11/1983 | Bowman | 73/204 |

OTHER PUBLICATIONS

Capsule Thermistor Course, Copyright 1974 by Fenwal Electronic Div., Walter Kidde & Co. Inc., pp. 2–12.
Thermistor Manual EMC-6, Copyright 1974 by Fenwal Electronics Div., Walter Kidde & Co. Inc., pp. 1–7.
Alnor Instrument Co. Flyer Revised, Oct. 1980, Entitled Alnor Thermo-Anemometer, p. 1.
Datametrics, Inc., Bull.—100, Aug. 1976, Model 100-VT Portable Air Velocity & Temperature Meter, pp. 2–14.
Kurz Inst's Inc., Spec. Sheet No. 440, Dec. 1980, Entitled Air Velocity Meter, pp. 1 and 2.
Kurz Inst's Inc. Spec. Sheet No. 480, Apr. 1981, entitled Pocket Anemometer, pp. 1 and 2.

Primary Examiner—James L. Rowland
Assistant Examiner—Brian R. Tumm
Attorney, Agent, or Firm—McWilliams, Mann, Zummer & Sweeney

[57] ABSTRACT

A thermal anemometer arranged to measure air velocity over a wide range of ambient temperatures and velocities, and a method of measuring such air velocity free of influence of ambient temperature, in which the anemometer comprises a probe containing two separate and distinct sensing elements, and a hand held electronic read out unit that contains sensing signal electronic processing circuitry, function control, and an analog read out meter, with the probe and read out unit being interconnected by a self coiling cable. The probe sensing elements are a self heated thermistor and a solid state temperature sensing device, that are separately but simultaneously exposed, in use of the instrument, to the air flow, with the energy consumed by the thermistor, and its resulting signal, being an indication of both the velocity of the air stream and the difference in temperature between the forced operating temperature of the thermistor and the air stream ambient temperature. The solid state temperature sensing device is a temperature sensing transistor, and develops a signal that is proportional to the air stream temperature. The two signals are electronically combined at the read out unit to eliminate the effect of any ambient temperature variations, to provide an air stream velocity reading at the meter that is independent of ambient temperature.

7 Claims, 15 Drawing Figures

THERMAL ANEMOMETER

This invention relates to a thermal anemometer and a method of measuring air flow velocity, and more particularly, to a device and method for measuring the velocity of air flow based on the cooling effect of an air stream on a heated body and the relationship of that cooling effect to the velocity of the air stream for direct read out of the velocity.

Devices for measuring air flow and velocity find many uses, such as in checking and monitoring heating, ventilation, and air conditioning systems, as aids to installation and checking of exhaust and fume hoods for OSHA compliance, in meteorology and fluid mechanics studies and research, mass flow measurements, and the like.

Conventional devices of this type that are available typically involve a probe that is to be placed in the air stream (the velocity of which is to be measured), and the instrument proper, which contains the circuitry and other components and devices that are arranged to provide a read out within the capability of the anemometer device involved. While such devices are usually to a degree portable, the instrument proper is typically relatively large, frequently heavy, hard to handle, and all too often does not have either adequate accuracy, or a wide range of velocity capability, especially to the near zero velocity range, or both.

A principal object of the present invention is to provide a light weight, battery operated, easy to handle, thermal anemometer, comprising a read out unit of modest size containing the sensing signal processing circuitry, function controls, and read out meter, that is proportioned for hand held use, and a light weight simplified probe containing the instrument sensing elements that are electrically connected to the signal processing circuitry through a self coiling cable that connects the probe to the read out unit.

Another principal object of the present invention is to provide in an anemometer, a self heated thermistor type sensing device and associated circuitry and components that provide at the read out meter a velocity reading that is independent of ambient temperature.

Still another principal object of the invention is to provide a method of measuring the air velocity of an air flow that is free of influence of ambient temperature, and that provides the air flow reading in terms of linear units per unit of time and provides accurate results over a wide range of velocities and ambient temperatures.

Yet another principal object of the invention is to provide in a thermal anemometer a dual air flow sensing arrangement comprising a thermistor operated in the self heated mode, and a separate solid state temperature sensing device, with the signals of both sensors being controlled and combined to provide an air velocity read out capability over a wide range of velocities and ambient temperatures, which read out is in terms of velocity that is independent of ambient temperature, and is designated in appropriate units of linear measurement per unit of time, such as feet per minute.

Other objects of the invention are to provide a thermal anemometer of the type indicated that includes a "push to test" switch that electrically shuts off the device when it is not in use to conserve the useful life of the instrument batteries, that has its circuitry arranged to provide for quick warm up of the thermistor when use is desired and timed shut off of the warm up period when the thermistor is at its operating temperature, to provide for simplified printed circuit board mounting of the instrument sensing components in the probe, and simplified printed circuit board mounting of the instrument electronic signal processing circuitry, function controls, and meter read out in the instrument read out unit, and also to provide a thermal anemometer that is inexpensive of manufacture, readily adapted to a wide variety of applications, easy to handle and read, and accurate, reliable, and long lived in use.

In accordance with the invention, a thermal anemometer is provided having two separate and distinct sensors applied to the probe, that provide separate signals to the signal processing circuitry of the read out unit which are electronically combined to provide, as the instrument read out capability, air velocity in terms of the appropriate units of linear measurement per unit of time, over a wide range of velocity and ambient temperatures, which read out is independent of ambient temperature of the air stream being measured. A thermistor operated in a self heated mode is the velocity sensing element of the instrument and is used in one branch of a self regulating bridge circuit, the bridge circuit being arranged to force the thermistor to operate at a particular resistance that corresponds to a specific temperature, 200 degrees C. in the disclosed embodiment. Any air movement across the thermistor will cause an increase in the input power required to maintain the said operating temperature of the thermistor, with the energy consumed by the thermistor being an indication of both the velocity of the air stream, and the difference in temperature between the operating temperature of the thermistor and the ambient temperature of the air stream. The other sensing element of the probe is a solid state temperature sensing device in the form of a temperature sensing transistor that is located to sense the temperature of the air stream, but is operated in a mode which is not affected by velocity, and which generates a signal that is in proportion to the temperature of the air stream. The two resulting signals are electronically combined using log and antilog transistors, all mounted in a common circuit board forming substrate in a single integrated circuit package to eliminate any other effects of temperature difference among the critical components, for providing a velocity reading that is wholly independent of ambient temperature. The instrument circuitry is battery powered and is equipped with a "push to test" switch that shuts off the device when it is not in use (to conserve the batteries), and a battery indicator is provided to let the operator know when the battery or batteries should be replaced. The thermistor is operated in the self heating mode, and in the self regulating circuit in which the thermistor is employed, the thermistor is forced to operate at the resistance value corresponding to 200 degrees C. by providing that the self regulating bridge circuit opposite legs both have a resistance ratio of 2 to 1, and by providing for on the thermister side of the bridge, the other leg of that bridge side to have a resistance equal to one-half that of the thermistor.

Since the thermistor is to be operated in the self heating mode, and it has an ohmic value when cold that is much higher than when it is heated, the circuitry is arranged to have a fast warm up period, upon the instrument being energized for operation, which is controlled by a timer circuit to increase the current flow through the thermistor during warm up, which timer circuit also at the same time controls the read out meter to prevent erratic pointer movement during warm up.

Yet other objects, uses and advantages will become obvious or be apparent from a consideration of the following detailed description and the application drawings in which like reference numerals are employed to indicate like parts throughout the several views.

In the drawings:

FIGS. 4–11 diagrammatically and schematically illustrate the several circuits or subcircuits that are involved in the device circuitry, with the individual figures illustrating the following circuits:

FIG. 13 is a highly simplified representation of the instrument probe sensors, and the basic electrical energy sourcing and signal processing circuits that the probe components are electrically associated with.

However, it is to be distinctly understood that the drawing illustrations are provided primarily to comply with the disclosure requirements of the Patent Laws, and that the invention is susceptible of modification and variations that will be obvious to those skilled in the art, and that are intended to be covered by the appended claims.

GENERAL DESCRIPTION

Figure 1:
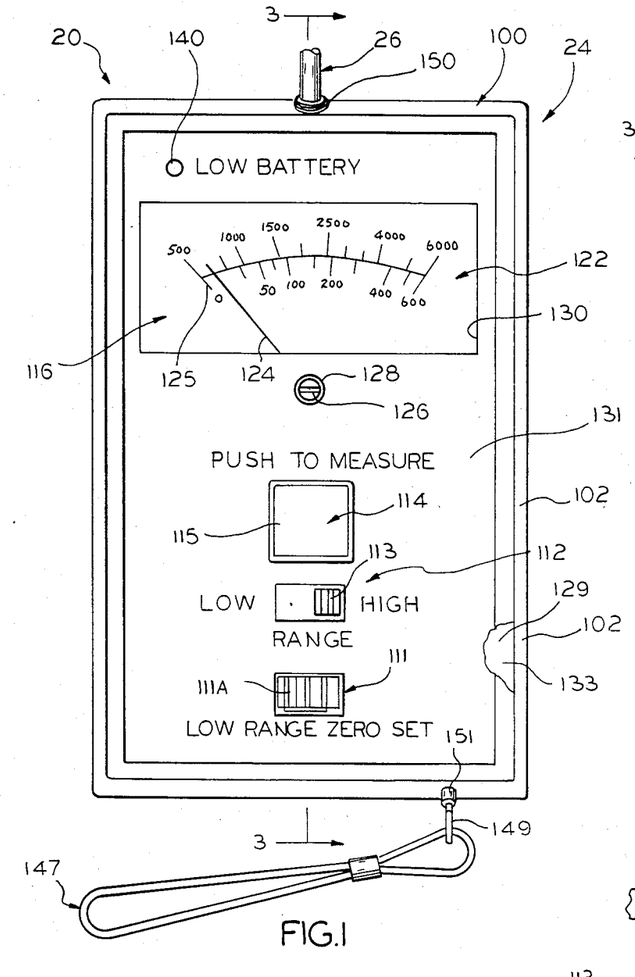
FIG. 1 is a top plan view of the thermal anemometer read out unit.
Figures 2, 2A:
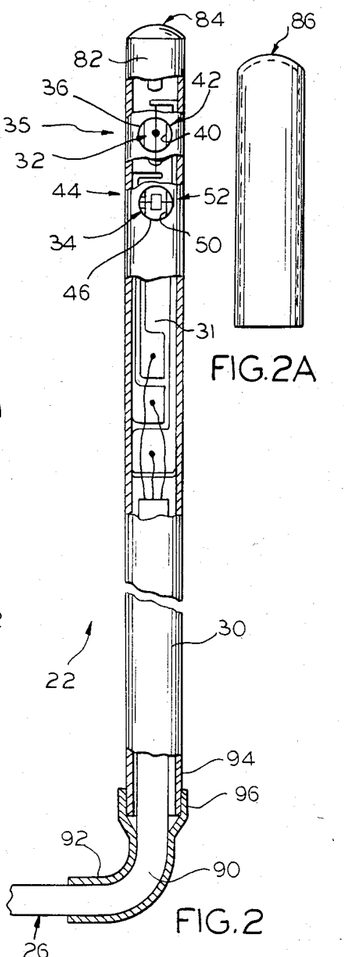
FIG. 2 is a plan view of the probe that contains the anemometer sensing elements, looking directly at the probe porting for its sensors, with parts broken away to expose diagrammatically illustrated circuit board mounted components within the probe, and with the probe protective end cover removed for using the device.
FIG. 2A is a plan view of the probe protective end cover that is applied to the sensor bearing end of the probe to overlie the dual porting of same, for the respective probe sensors, when the device is not in use.
Figure 3:
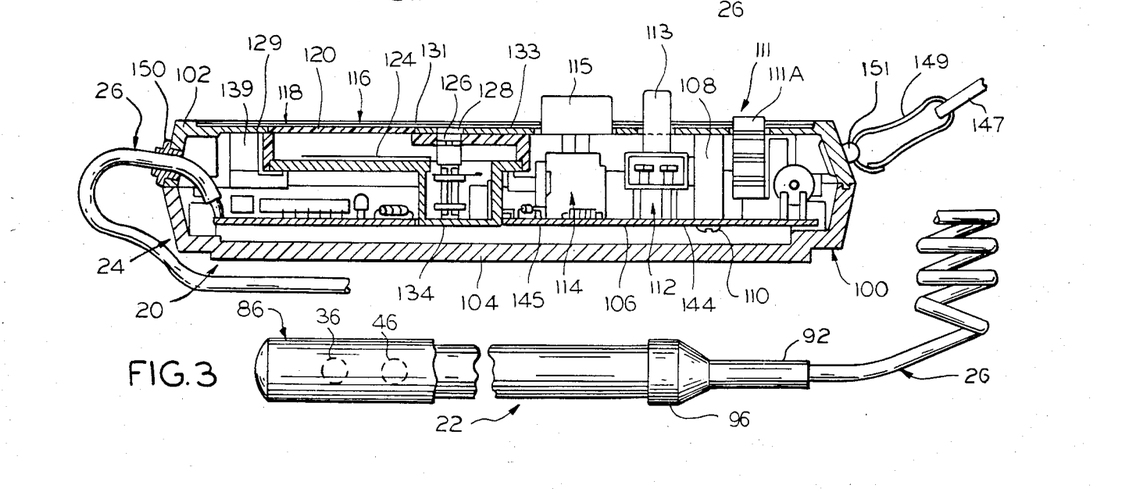
FIG. 3 is a diagrammatic cross-sectional view of the read out unit, taken substantially along line 3—3 of FIG. 1, diagrammatically illustrating the internal nature of the read out unit which is largely shown in block diagram form, with the probe and connecting cable also being diagrammatically illustrated.

Reference numeral 20 of FIGS. 1–3 generally indicates the thermal anemometer instrument as a whole, which comprises probe 22 that contains the instrument sensing elements, the read out unit 24 for assembly 20, which contains the electronic signal processing circuitry, function controls, and the instrument read out mechanism, with the probe 22 and read out unit 24 being interconnected by self coiling instrument cable 26.

The probe 22 comprises an elongate tubular member 30 that is preferably formed from a suitable corrosion resistant material such as stainless steel in which is received a single printed circuit board 31 of elongate configuration, on which is mounted the two sensing elements of the instrument, which in accordance with the present invention comprise a thermistor in the form of thermistor bead 32 that is to be operated in the self heated mode, and a solid state temperature sensor 34 that in the illustrated embodiment is in the form of a temperature sensitive transistor. The sensor 32 is disposed between a pair 35 of aligned apertures 36 and 38 formed on opposite sides of the probe tube 30 (compare FIGS. 2 and 12), with the circuit board 31 being apertured as at 40 to receive the thermistor bead 32 therein whereby the probe tube apertures 36 and 38 and the circuit board aperture 40 form air stream through passage 42 through the probe 22 that extends transversely thereto.

Figure 12:
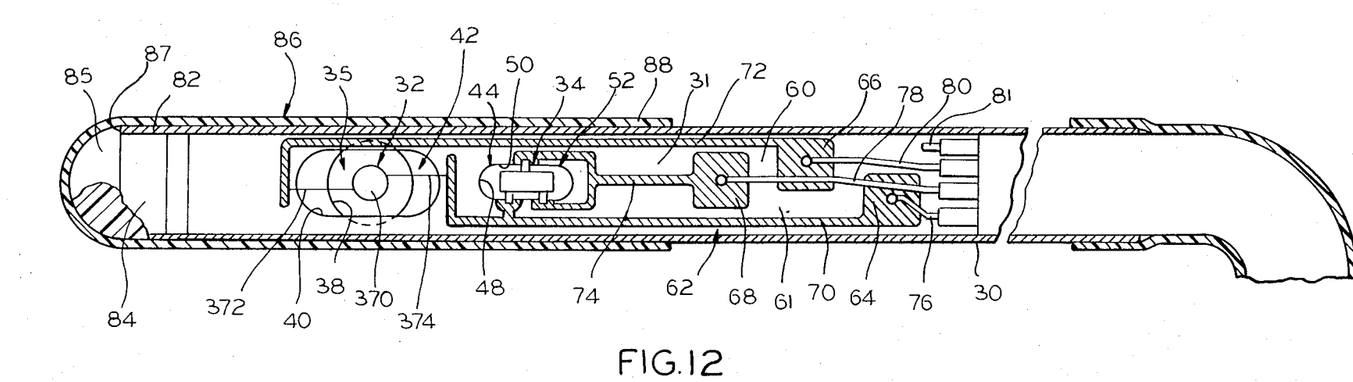
FIG. 12 is a view of the probe similar to that of FIG. 3, but on an enlarged scale and in section to better illustrate the circuit board and sensor devices involved as well as the probe porting therefor, and showing the probe end cover in place when the instrument is not being used.

Similarly, the probe tube 30 is formed with a pair 44 of oppositely positioned apertures 46 and 48 that are of the same size as apertures 36 and 38, but are spaced therefrom longitudinally of the probe, with the circuit board 31 being formed to define aperture 50 in which the sensor 34 is mounted. The pair 44 of apertures 46 and 48 and the circuit board aperture 50 are aligned to define a second air stream through passage 52 that extends transversely of the probe and parallels passage 42, but is spaced therefrom longitudinally of the probe, as indicated in FIGS. 2 and 12.

The circuit board 31 itself may be of any conventional type and defines suitable substrate 60 formed from one of the usual dielectric plastic materials such as glass epoxy, which has imprinted or delineated on same, in any suitable manner, on one side 61 of same, circuiting 62 in the form of pads or terminals 64, 66 and 68 and leads or traces 70, 72 and 74, with the respective sensors 32 and 34 being connected with the respective leads or traces in the manner described hereinafter, and the respective terminals 64, 66 and 68 being connected to the respective lead wires 76, 78 and 80 that are part of the cable 26 and form connectors back to the read out unit 24, in the manner described specifically hereinafter. The circuit board leads and terminals may be formed in any conventional manner and usually comprise copper or other electrically conductive material, as is well known in the art. In the embodiment illustrated the leads and terminals comprise copper foil suitably adhered to the circuit board in any conventional manner, which are preferably over plated with tin-lead, solder reflow, or the like for protective purposes.

The probe tube 30 at its aperture or through passage providing end 82 is closed by a suitable press or force fitted plug 84 formed from a suitable dielectric plastic material, such as nylon, that is received in tube end 82 in plug fit relation thereto, with its head 85 in full contact with the tube end rim 87 (see FIG. 12) annularly thereabout. The probe end 82 is preferably covered with suitable close fitting cover 86, when the instrument is not in use. Cover 86 preferably is formed from vinyl or the like, and has its side wall 88 of sufficient length to extend well beyond the pairs of ports 35 and 44 so as to close off air flow passages 42 and 52 when the instrument is not in use, or when adjusting the instrument low range zero (as described hereinafter). The internal diameter of cover 86 is proportioned for slip fit application to tube end 82, with frictional retention on the tube 30. When the instrument is to be used, the cover 86 is removed from its slip fit applied relation shown in FIG. 12, to expose through passages 42 and 52 for test purposes.

The cable 26 may be of any suitable type of self coiling cable having the requisite leads, and at its end 90, in the form illustrated, extends through tube 92 that is heat shrunk against the end 94 of probe tube 30, as at the end 96 of tube 92, or suitably connected to the tube 30 in any other convenient manner, to present the cable connectors or conductors 76, 78 and 80 for appropriate soldered connection to the circuit board terminals 64, 66 and 68, respectively, in any convenient manner. The cable 26 specifically illustrated has an extra connector or conductor 81 that is not used for this application. Tube 92 may be right angled (as shown) or otherwise angled or be straight, as desired.

The read out unit 24 generally comprises a relatively small, generally flat or planar casing or housing 100 or generally parallelepiped configuration that is proportioned for being hand held by the user (the casing 100 preferably being dimensioned to be approximately 5 and ½ inches by 3 and ½ inches by 1 inch, as an example), with the casing comprising upper case 102 and lower case 104 that are preferably formed from a suitable moldable plastic material of dielectric characteristics, which are secured together in any suitable manner, as by securing screws (not shown) being applied between the two through the lower case 104 at the four corners of the casing or housing 100.

The casing or housing 100 suitably mounts a single printed circuit board 106 to which the electronic signal processing circuitry, function controls, and meter read out are secured. In the embodiment illustrated, the top case 102 is formed to define a pair of spaced apart tubular studs 108 to which are applied the respective screws 110, through the respective circuit board apertures 109 (see FIG. 14), that key the printed circuit board 106 to the top case, after the various components mentioned have been applied to the circuit board and tested.

Figure 14:
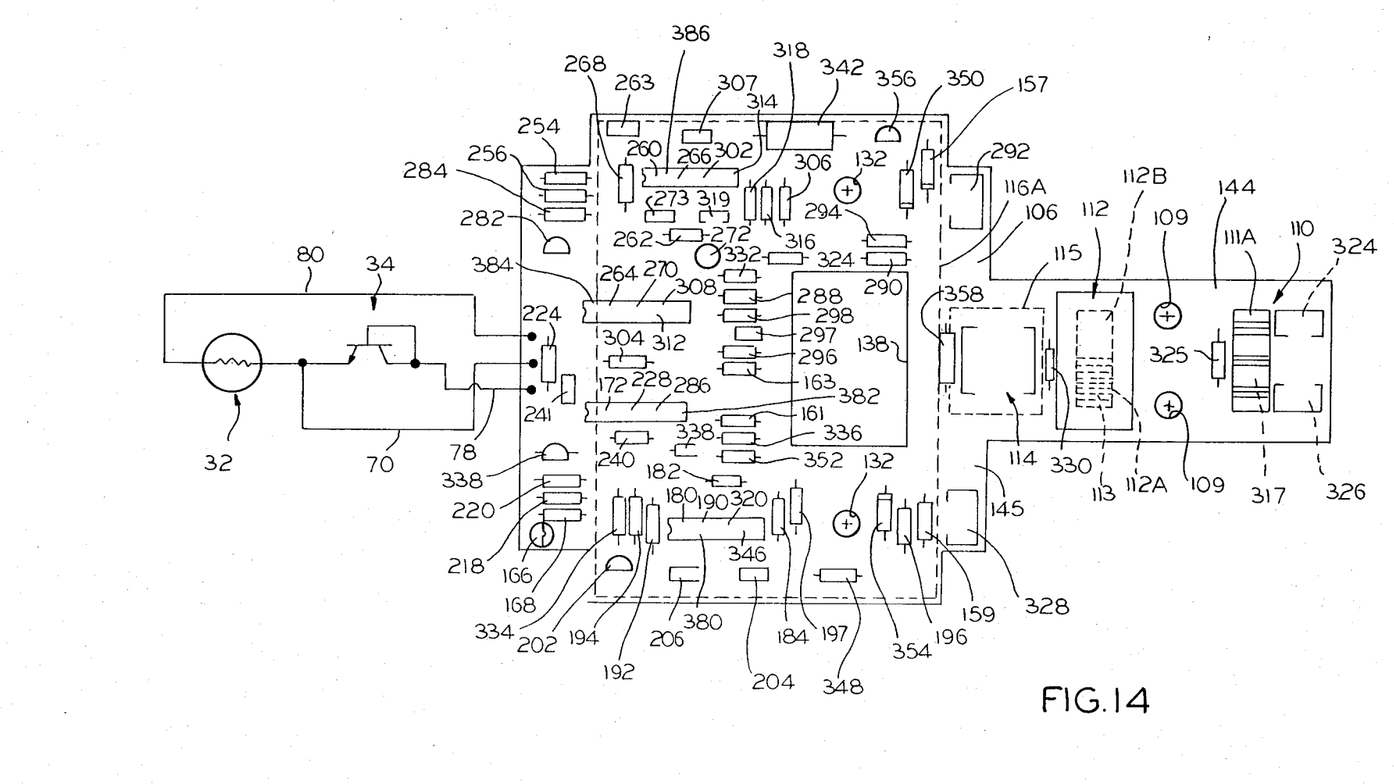
FIG. 14 is a plan view diagrammatically illustrating how the probe mounted sensor components and the remaining circuitry components are related in the instrument, as connected and applied to the circuit board of the instrument read out unit.

The circuit board itself is shown in plan in FIG. 14, in which the location of a number of the electronic components and switches are indicated, which as indicated in FIGS. 1 and 3 includes a low range zero set control device 111, that is operated or adjusted by thumb wheel 111A, a low-high range select switch 112, operated by slide button 113, a "push to measure" switch 114, that is operated by push cap or button 115 and is used to initiate a reading by the instrument 20, and read out meter 116 that in the illustrated embodiment is of a conventional moving magnet (or moving coil, etc.) meter type mounted in a suitable casing 118 that includes a transparent face panel 120 through which an anemometer scale 122 and a read out pointer 124 are visible, with the pointer 124 conventionally being arranged to be set on a zero datum 125, using suitable adjustment screw 126 that is disposed below aperture 128 of the top case 102. Top case 102 is also formed with a web wall 129 that defines aperture 128 and a suitable window 130 in which the front panel 120 of the meter 116 is lodged; web wall 129 has name plate 131 applied to its top surfacing 133 that is apertured in confirmity with top case apertures 128 and 130 and to accommodate switches 110, 112 and 114, and has imprinted on same the identifying indicia indicated in FIG. 1. Name plate 131 may conveniently be in the form of adhesive backed aluminum that is seal coated with a suitable clear epoxy when applied in place on top case 102.

The meter casing 118 is conventionally equipped with a pair of threaded studs on either side of same (not shown) that are lodged in the apertures 132 of the circuit board 106 (see FIG. 14) for application thereto of suitable nuts that secure same to the circuit board 106. The meter casing 118 includes projecting portion 134 (see FIG. 3) that seats in the correspondingly shaped opening 138 of the circuit board 106, with suitable corner clips 139 at each corner of the meter case being suitably removably secured to the inside surfacing of the top case 102 as by employing suitable screw and nut type fasteners (not shown) to hold the upper portion of the meter case 120 in place against the inside of the top case, which also anchors the circuit board to the top case 102 by way of the indicated meter casing securement thereto at circuit board openings 132.

The read out unit 24 is also equipped with a viewing window 140 through which light is visible (from a light emitting diode) when the batteries are low to warn the instrument user that the batteries should be changed (as will be described hereinafter). The batteries (not shown) are suitably mounted within the casing 100 on either side of the stem portion 144 of the circuit board 106 and are appropriately connected to the instrument circuiting in any conventional manner to provide the electrical energy source that is required.

The circuit board 106 itself may be of any conventional type and defines suitable substrate 145 formed from one of the usual dielectric plastic materials, such as glass epoxy, which has imprinted or delineated on same, in any suitable manner, on both sides of same, circuiting in the form of pads or terminals and leads or traces similar to those of 60 and 61, arranged and associated with electrical and electronic components to define the circuiting of FIGS. 4-13 that is described specifically hereinafter. The circuit board leads and terminals may be formed in any conventional manner and usually comprise copper or other electrically conductive material, as is well known in the art. In the embodiment illustrated the leads and terminals comprise copper foil suitably adhered to the circuit board in any conventional manner, which are preferably over plated with tin-lead, solder reflow, or the like, for protective purposes.

Figure 13:
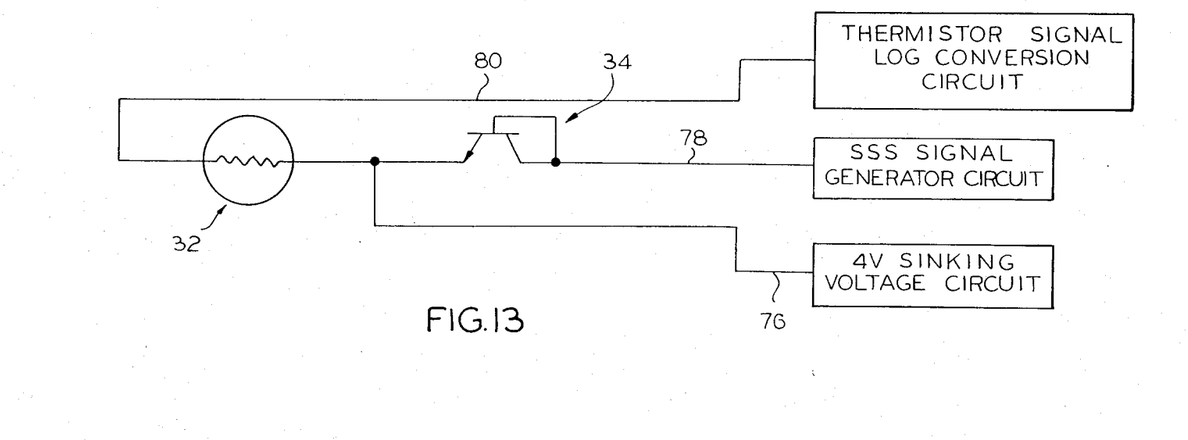

The cable 26 containing the leads 76, 78 and 80 enters the casing 24 through suitable strain relief sleeve 150 that is mounted in the top case 102, with the indicated leads being physically connected to the components of the circuit board 106 in the manner suggested in FIG. 13. The casing 100 also includes a suitable wrist strap 147 that is swingably connected to the casing 100 by a conventional link 149 that is in turn snap fit connected to the apertured stud 151 which is suitably mounted in the casing top case 102, so that the user may apply the wrist strap 156 to his wrist when holding the read out unit 24 in his hand for use, as a safety measure to avoid dropping the unit 24.

With the basic physical arrangement of the instrument in mind, the principles upon which its arrangement is based and a diagrammatic illustration and description of the circuitry, function controls, and read out of the instrument, are appropriate subjects for disclosure.

GENERAL PRINCIPLES OF MEASUREMENT AND OPERATION

As has been discussed hereinbefore, the anemometer of this invention is arranged to measure air velocity over a wide range of ambient temperatures and velocities. For test use, it is assumed that the user of the instrument 20 is holding the read out unit 24 in one hand, with the top case exposed or visible to the viewer, and holds the probe in the other hand. The probe is readied for use by initially removing its cover 86, and after the unit 24 is disposed in its hand held operating position, holding the probe end 82 in the air stream to be measured, with the probe being disposed so that its passageways 42 and 52 are in substantial parallelism with the direction of air flow of the air stream, whereby the air flow involved sweeps past thermistor 32 and the solid state sensor 34. When the read out unit 24 is energized in the manner hereinafter described in detail, the thermistor 32 and solid state sensor 34 are energized, and these two sensors are arranged to generate two separate signals that are electronically combined to provide a combined signal which is employed to provide a velocity reading read out that is independent of ambient temperature of the air flow involved, and is measured at scale 122 by indicator arm 124 in terms of linear measurement per unit of time (feet per minute in the illustrated embodiment).

Insofar as the thermistor 32 is concerned, it is a commercially available thermistor bead that is operated in the self heated mode, and the dissipation of energy from same due to the air flow past same is used as the air velocity sensing means. The energy consumption involved is actually an indication of both the velocity of the air stream, and the difference between the operating temperature of the thermistor and the ambient temperature from the air stream. In practice of the invention it is the voltage across the thermistor 32 that is the quantity measured insofar as the thermistor 32 is concerned, and this may be expressed as $E_1$ equals the square root of the quantity $(K_1)$ $(T_f)$ $(V_f)$, where $E_1$ equals the thermistor voltage, $K_1$ equals a physical constant, $T_f$ equals a value as a function of temperature difference, and $V_f$ equals a value as a function of velocity.

Thus, the thermistor voltage $E_1$ varies as energy dissipation of the thermistor is varied due to either the velocity of air flow past it or the difference of the ambient temperature of the air stream as compared to the operating temperature of the thermistor, or both.

In accordance with the present invention, the solid state sensor 34 is operated simultaneously with the operation of the thermistor 32 to cancel out, from the read-out that is to be provided by the instrument, the effect of variations in air stream ambient temperature, whereby the velocity measurement made is independent of ambient temperature over a wide range.

Sensor 34 is in the form of an NPN silicone temperature sensing bipolar transistor, which is electrically arranged to generate a signal in proportion to the temperature of the air stream being measured, with the sensor 34 thus having a linear output signal, with the circuitry in which the sensor 34 is involved making use of the temperature dependence of the voltage drop across the transistor base-emitter junction, which is in the indicated linear relationship.

The sensor 34 has an output signal in which the voltage across the sensor 34, $E_2$, equals $(K_2)$ $(T_f)$, in which $K_2$ equals a physical constant, and $T_f$ is a value as a function of ambient temperature.

The arrangement of the anemometer of the present invention effects an electronic combining of the signals of the thermistor 32 and the solid state sensor 34 whereby the thermistor output voltage squared is divided by the solid state sensor voltage to cancel the value $T_f$ from the thermistor output voltage. This is achieved in the practice of the invention by converting the signals of the thermistor 32 and the solid state sensor 34 to the equivalent of logarithms of same, combining the two signals logarithmically to provide a remainder signal, and providing the resultant signal in antilogarithm equivalency of the remainder signal.

Mathematically, the logarithm of the voltage across the thermistor may be expressed as ln. $E_1$ equals (ln. $K_1$ plus ln. $T_f$ plus ln. $V_f$)/2, while the logarithm of the voltage across the solid state sensor 34 may be expressed as ln. $E_2$ equals ln. $K_2$ plus ln. $T_f$.

The logarithm of the voltage across the thermistor as expressed above may also be expressed as (2)(ln. $E_1$) equals ln. $K_1$ plus ln. $T_f$ plus ln. $V_f$.

In this form, the subtraction (2) ln. $E_1$ minus ln. $E_2$ may be performed, which equals ln. $K_1$ plus ln. $T_f$ plus ln. $V_f$ minus ln. $K_2$ minus ln. $T_f$, which in turn equals ln. $K_1$ minus ln. $K_2$ plus ln. $V_f$.

With the $T_f$ temperature term eliminated and taking the anti log of the resulting equation we have $E_3$ equals $(E_1)^2/(E_2)$ equals $(K_1/K_2)$ $(V_f)$, in which $E_3$ is the combined output signal that provides a direct reading of velocity in terms of linear measurement per unit of time that is wholly independent of ambient temperature.

With the foregoing in mind, FIGS. 4-11 diagrammatically and schematically illustrate the several circuiting arrangements involved that are employed to provide the combined $E_3$, and provide for utilization of this signal by direct readout by the instrument 20 of the velocity of the air flow, in one or more of the usual terms in which air flow rate is stated, such as in terms of the English or Metric System of units. In the instrument illustrated, the read out is in feet per minute with low and high ranges being provided for.

DESCRIPTION OF INSTRUMENT CIRCUITRY

As already indicated, except for the thermistor 32 and the solid state sensor 34 and the connecting wiring connected to same via cable 26, the instrument circuitry is all applied to a common printed circuit board 106, with the circuitry itself, the printed configurations the same, and the components involved being arranged in any suitable convenient manner in light of the disclosure herein made, in accordance with established principles of printed circuit board circuiting delineation and incorporation of electrical and electronic components in connection therewith, aside from the specific arrangements illustrated in the drawings.

Figures 4, 5, 6:
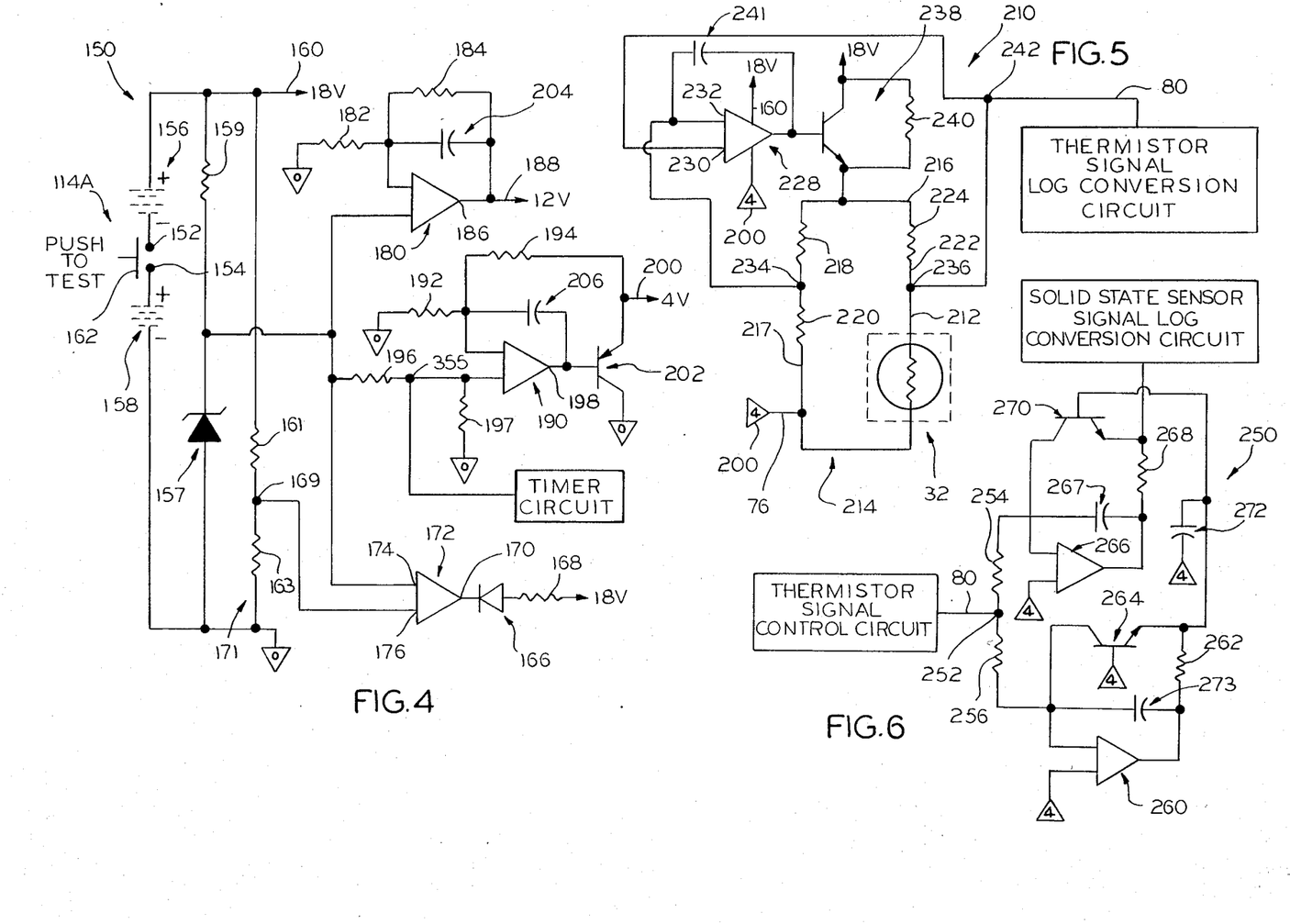
FIG. 4 illustrates the power source and voltage regulator circuit.
FIG. 5 illustrates the thermistor signal control circuit.
FIG. 6 illustrates the thermistor signal log conversion circuit that is employed in the specific arrangement illustrated.

FIG. 4 illustrates the basic essentials of the power source and voltage regulator circuit 150 for the instrument, which comprises push to test switch section 114A, that when closed closes contacts 152 and 154 and connects batteries 156 and 158 in series to provide a nominal battery supplied voltage of 18 volts at output connector 160. While batteries 156 and 158 are preferably each 9 volt batteries, as a matter of economics and convenience, any direct current power source capable of delivering a nominal 18 direct current voltage at a maximum load of 100 milliamps may be employed to energize the circuit 150. In the form illustrated the push to test switch 114 includes contactor 162 that as section 114A closes contacts 152 and 154, as well as the contactor 163 that normally closes contacts 165 and 167 switch section 114B of FIG. 10, with the switches 114A and 114B being structurally united and spring biased in any convenient manner to provide in the instrument 20 the normally open function of switch section 114A and the oppositely acting normally closed function of switch 114B (the latter of which will be more specifically described in connection with the description of the circuit 322 of FIG. 10).

In the showing of FIG. 4, as well as in the showing of the circuits of FIGS. 5–11, the lines represent the leads, and the darkened circles represent contacts; the triangle symbols containing the number zero are connections to ground. The other symbols employed will be specifically referred to as the disclosure proceeds.

Providing in the circuit 150 (see FIG. 4) a reference voltage of 5.6 volts, is voltage regulator 157, which is a suitable zener regulating diode, and suitable resistor 159, with the current flow through the voltage regulator 157 being limited to the range of from about 9.4 milliamps to about 12.4 milliamps, depending on the actual supply voltage, by the resistor 159.

Suitable resistors 161 and 163 form a resistance voltage divider subcircuit 171 that at their common contacts 169 will have a voltage that is a suitable fraction of the voltage supply, 0.377 in the illustrated embodiment, whereby if the battery supply of voltage decreases to 15 volts the voltage available at contact 169 decreases to approximately 5.6 volts.

Reference numeral 166 of FIG. 4 indicates a light emitting diode, which is connected in series with the 18 volt supply connector 160 through resistor 168. Diode 166 is connected to the output 170 of suitable integrated circuit amplifier 172 which has its inputs 174 and 176 connected to the points of circuit 150 where the voltage across the voltage regulator 157 and the voltage across the resistors 161 and 163 are present in such a manner as the output of the amplifier 174 is high, say 18 volts, as long as the voltage at contact 169 is greater than the voltage across voltage regulator 157, under which conditions there is no current flow through resistor 168 and diode. When the voltage divider voltage at contact 169 is less than that of the voltage regulator 157, the output of amplifier 172 is reduced to zero volts, whereby a current flow occurs through resistor 168 and diode 166. Diode 166 in the specific arrangement illustrated is of the light emitting type and incorporates the low battery indicating window 140 shown in FIG. 1, with the lighting of this indicator alerting the operator to the necessity of replacing the batteries due to their state of discharge that could affect the accuracy of the instrument's measurements.

Circuit 150 of FIG. 4 also includes integrated circuit amplifier 180 having its gain set by resistors 182 and 184 to a value of two, with the input voltage at the non-inverting input (the voltage across the voltage regulator) therefore being doubled at the output 186 of the amplifier 180 providing a power supply at power supply source connector 188 that is approximately 12 volts direct current, this being a sourcing supply (that is, it will provide a current flow into a load).

Circuit 150 also includes integrated circuit amplifier 190 having its gain set by resistors 192, 194, 196, 197 to be a value of ⅔ and the input voltage at resistor 196, which is connected to the non-inverting input of amplifier 190 (the voltage across the voltage regulator 157) is therefore multiplied by the ratio of ⅔ at the amplifier output 198 providing a sinking power supply with a nominal output of 4 volts direct current, that thus accepts current flow from a load at sinking supply connector 200. Amplifier output 198 is connected to sinking voltage connector 200 through bipolar transistor 202 that is of the PNP type.

Capacitors 204 and 206 serve the same purpose in their respective amplifier circuits, which is the prevention of unwanted oscillation by increasing the circuit stability, and this is true of the other capacitors in point in the other circuits specifically described hereinafter. This is also true of capacitors 241, 267, 273, 297, 307, 319 and 338 of the circuits of FIGS. 5–10.

Referring now to FIG. 5, which illustrates the thermistor signal control circuit 210, thermistor 32 in the form of a commercially available thermistor bead is incorporated in the circuit 210 as one leg 212 of a self excited Wheatstone bridge subcircuit 214, with one side or half 217 of the bridge 214 being made up of upper and lower leg forming resistors 218 and 220, and the other side or half 216 of the bridge being made up of upper leg forming resistor 224 and the lower leg forming thermistor 32. In accordance with the invention the thermistor 32 is operated in the self heated mode at a predetermined constant temperature, which in the illustrated embodiment is 200 degrees C. The resistance value of the thermistor 32 at the selected operating temperature (here 200 degrees C.) is determined and the resistor 224 has a resistance of half that value. Resistor 220 has a resistance that is twice the value of that of resistor 218. The integrated circuit amplifier 228 of circuit 210 has its inputs connected at the junctions (contacts 234 and 236) of the upper and lower bridge legs of the respective ridge sides or halves 216 and 217. The error signal developed between the two contacts 234 and 236 that are involved causes the amplifier 228 to drive transistor 238 and maintains the excitation to the bridge 214 at that value necessary to maintain the resistance of thermistor 32 at a value twice that of resistor 224, which resistance value of the thermistor corresponds to the thermistor operating temperature (200 degrees C. in the disclosed embodiment). The resistance value of resistor 224 is selected in practice by noting the calibrated resistance value of the thermistor bead 32 in its commercial form, when measured in a liquid (for instance, a suitable oil) bath at the operating temperature selected, as provided by the manufacturer. The resistance of resistor 224 is then selected as the closest 1 percent tolerance resistance value available to equal one-half the calibrated resistance value of the thermistor, as it is measured at the selected operating temperature (200 degrees C. is preferred).

It is to be noted, in this connection, that in practice the operating temperature of the thermistor bead may be other than 200 degrees C.; the 200 degree C. temperature is employed in the illustrated embodiment because it is sufficiently above normal operating temperatures to be used as a reference temperature. The operating temperature of the thermistor should lie in the range of from about 150 degrees C. to about 300 degrees C., the latter being the maximum allowable operating temperature of the thermistor.

The resistance 240 is provided to maintain a small initial current flow through the bridge circuit 214 so that as power is supplied, the inputs of amplifier 228 are biased fgr proper operation. Amplifier 228 and the collector side of transistor 238 have appropriate connections to the 18 volt source connector 160, and amplifier 228 also has appropriate connection to the 4 volt sinking voltage connector 200, a leg 216 of bridge 214 also being similarly connected to the 4 volt sinking voltage connector 200 of circuit 150, by way of connector 76 in the showing of FIG. 13.

The voltage developed across the thermistor bead 32 by the operation of circuit 210, when the thermistor bead is exposed to the air stream, is available at contact 242 and is a function of air velocity across the bead and the ambient temperature in which the bead is operated, that is the difference in temperature between the operating temperature of the bead and the ambient temperature of the air stream. This voltage is applied to the thermistor signal log conversion circuit 250 (illustrated in FIG. 6) by way of lead 80 of FIGS. 12 and 13.

Referring to circuit 250 of FIG. 6, lead 80 is connected to the terminal 252 representing the junction between resistors 254 and 256 that are of equal resistance value. In the circuit 250 the thermistor voltage is applied to the inverting input of integrated circuit amplifier 260 through resistor 256, with the current through resistor 262 being the same as the current through resistor 256; such current also passes through NPN transistor 264, with the current passing from collector to emitter of transistor 264 and its base being held at the 4 volt direct current reference level by appropriate connection to connector 200. The collector to emitter current flow of the transistor 264, which is directly proportional to the voltage across thermistor 32, causes a base to emitter voltage drop in such transistor 264 which is the logarithmic equivalent of such current flow.

Simultaneously the thermistor voltage is also applied to the inverting input of integrated circuit amplifier 266 by way of resistor 254. In the arrangement of the configuration of amplifier 266, the current through resistor 268 is again the same as that through resistor 254, and such current also passes through NPN transistor 270 from collector to emitter, with the base of this transistor being connected to the emitter of transistor 264. The emitter to collector current flow of transistor 270 is again directly proportional to the indicated thermistor voltage (the voltage across the thermistor 32) and and causes a base to emitter voltage drop in this transistor which is the logarithmic equivalent of that current flow. The voltage level present between the emitter of transistor 270 and the 4 volt direct current reference of circuit 150 is a value two times the logarithmic equivalent of the voltage across the thermistor.

In the circuit 250, the capacitor 272 is present to provide the circuit with increased stability and also acts to average out any small rapid fluxations in the thermistor input signal, and thus provide a steady output for accurate meter reading purposes. Capacitors 267 and 273 of circuit 250 serve the same purposes as capacitors 204 and 206 of circuit 150.

Figure 7:
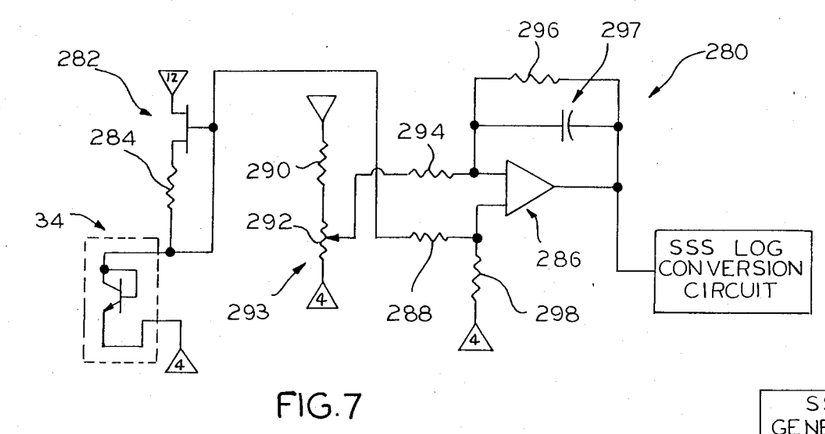
FIG. 7 is the solid state temperature sensor signal generator circuit.

Referring now to the solid state sensor signal generator circuit 280 of FIG. 7, at the same time that the thermistor bead 32 is sensing the velocity of the air stream and its ambient temperature as a portion of its output signal, the solid state sensor 34 is separately exposed to the same air stream, sensing the ambient temperature of the air stream and by its nature is unaffected by variations in the air stream velocity. As mentioned hereinbefore, the sensor 34 is a temperature sensor NPN bipolar transistor, the voltage drop across the base-emitter junction of which is temperature dependent in a linear relationship. In the circuit 280, transistor 282, which is a silicon transistor of the N-channel field effect type, and resistor 284 are arranged in a constant current source configuration to provide a constant current flowing through the base emitter junction of solid state sensor 34, whereby a constant voltage is developed thereacross, which, while constant for constant current flow, is also effected by the ambient temperature and responds in a linear proportion to changes in temperature. The resulting temperature sensitive junction voltage is applied to the inverting input of integrated circuit amplifier 286 by way of resistor 288. In the arrangement of circuit 280, resistors 290 and 292 comprise a voltage divider subcircuit 293 that establishes an ambient temperature reference voltage which is applied to the non-inverting input of amplifier 286 by way of resistor 294. The temperature sensitive junction voltage applied to amplifier 286 by way of resistor 288 and the reference voltage applied to the amplifier 286 are amplified, in conjunction with resistor 296, capacitor 297, and resistor 298 to amplify the resulting signal to an appropriate level. As indicated, the solid state sensor emitter (of sensor 34) is connected to the 4 volt reference voltage of circuit 150, as is the resistor 298.

Figure 8:
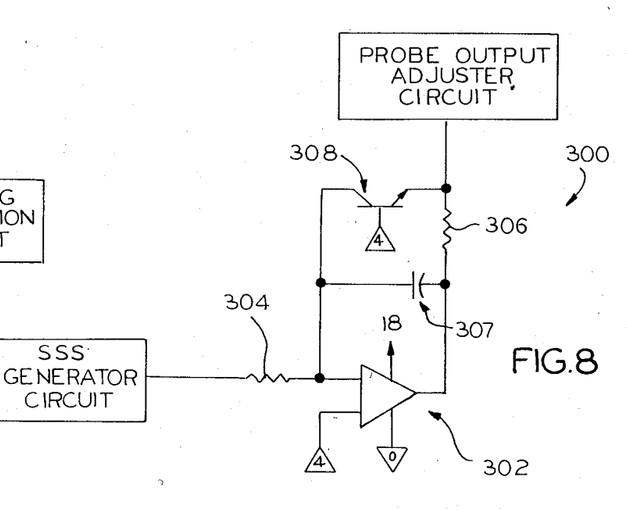
FIG. 8 is the solid state sensor signal log conversion circuit.

The amplified voltage signal from circuit 280 is applied to the solid state sensor log conversion circuit 300, and specifically to the inverting input of integrated circuit amplifier 302 by way of resistor 304. In the amplifier configuration involved, the current through resistor 306 is the same as through resistor 304 and also passes through NPN transistor 308 from collector to emitter, with the base of transistor 308 being connected to the 4 volt direct current reference of circuit 150. The current flow from emitter to collector of transistor 308, which is directly proportional to the input voltage to the transistor 308, causes a base to emitter voltage drop which is the logarithmic equivalent of such current flow, and provides the signal that is transmitted to the probe output adjuster circuit 310 of FIG. 9.

Figure 9:
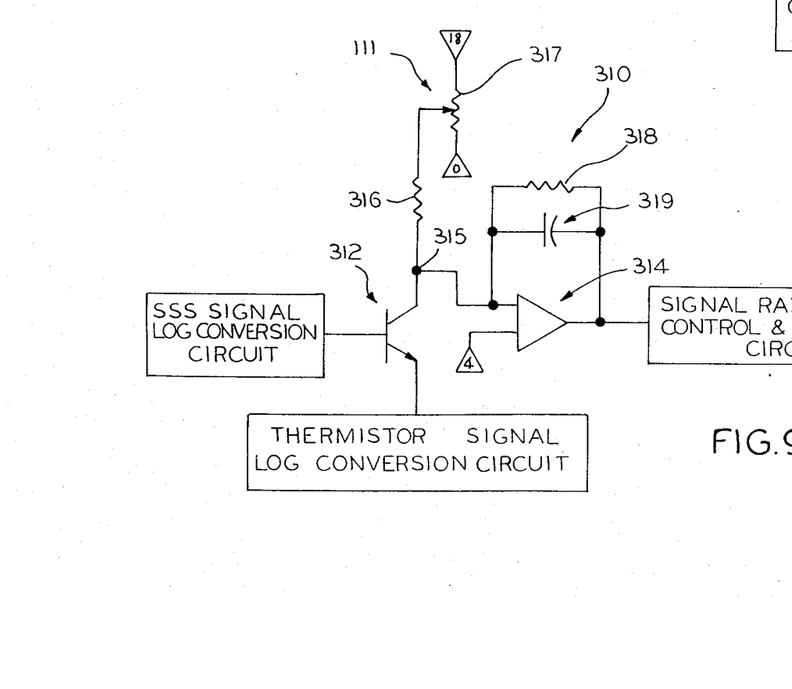
FIG. 9 illustrates the probe output signal adjuster circuit whereby the effect of any ambient temperature variation (from that of the thermistor) involved in the probe sensing signal generated is eliminated, to provide a combined or composite signal that represents velocity independent of ambient temperature, this Figure also illustrating a low scale or range zero adjuster or "set" control circuitry whereby the effect of any variations in circuit component values from unit to unit or a slight variation with time may be adjusted to define a zero reference point for velocity measurements.

The low range zero adjust circuit of FIG. 9 includes the NPN transistor 312 to the base of which is applied the signal in question. The base of the transistor 312 is maintained at the potential developed across the base emitter junction of transistor 308 while the emitter of transistor 312 is held at a potential equal to the base emitter junctions of transistors 270 and 264 combined.

It will thus be seen that the base emitter voltage of transistor 312 is equal to the log of twice the voltage across the thermistor (the thermistor voltage) minus the log of the solid state sensor voltage that has been provided (the voltage of sensor 34), and the resulting or remainder signal itself is a logarithmic value. As the base emitter junction voltage (of transistor 308) is the logarithmic equivalent of the transistor 308 collector current, the converse is also true. The collector current of the transistor 312 is therefore the anti-log of its base emitter voltage.

Thus, transistor 312 effects the subtraction of the logarithmic equivalent of the temperature compensation signal from the logarithmic equivalent of the signal generated by the thermistor, and the result is the equivalent to the division function of an anti-log operation, with the anti-log equivalent of the combined signal being applied to the input of amplifier 314, which produces an output signal equal to the thermistor voltage squared, and divided by the temperature compensation voltage, which provides an output signal from amplifier 314 that is free of influence of the ambient temperature of the air flow being sensed.

In connection with the circuit 310, due to tolerance variations in the components involved, it is necessary to provide a way of adjusting the circuit to provide for an exactly zero current output from amplifier 314 when there is no air flow across the thermistor 32. Thumb wheel control resistor 317, which is the operative part of switch 111, and is in series with resistor 316, permits the instrument to be set by finger adjustment of the resistor 317, using thumb wheel 111A to provide an output of zero from the integrated circuit amplifier 314 when there is no air flow across the thermistor 32, which condition is accomplished by placing cover 86 over probe end 82, and thus in the positioning indicated in FIG. 12. The junction contact 315 of the resistor 316 and the collector of transistor 312 is connected to the inverting input of amplifier 314 while the resistance of resistor 318 determines the gain of amplifier 314.

The output of amplifier 314 is thus equivalent to the magnitude of the air velocity across the thermistor bead. This signal is then applied to the non-inverting input of integrated circuit amplifier 320 of the signal range switch control and measurement circuitry 322 (FIG. 10), which both amplifies the signal and sets the reference for the low end of the scale of meter 116. Associated with circuitry 322 is the high and low range slide switch 112 which is arranged to define high and low range switch 112A and high and low range switch 112B. The low range position of switch 112A is indicated by the dashed line showing of FIG. 10, in which the inverting input of integrated circuit amplifier 320 is connected to the 4 volt current sinking supply (connector 200 of circuit 150), and any input signal from the probe output adjustment circuit 310 that is equivalent to zero, for instance, zero feet per minute and on up, is amplified, and such amplified signal is directed to the appropriate range resistor, either 324 or 326 by way of range switch 112B, which in the dashed line position is set for low range application. Resistors 324 and 326 are of the trimmer resistor variable adjustment type which may be adjusted by screw driver application. In the dashed line position of switch 112B, the signal involved is applied to the resistor 324, which is adjusted for full scale deflection of the meter at 600 feet per minute in its low range (in the illustrated embodiment).

Figure 10:
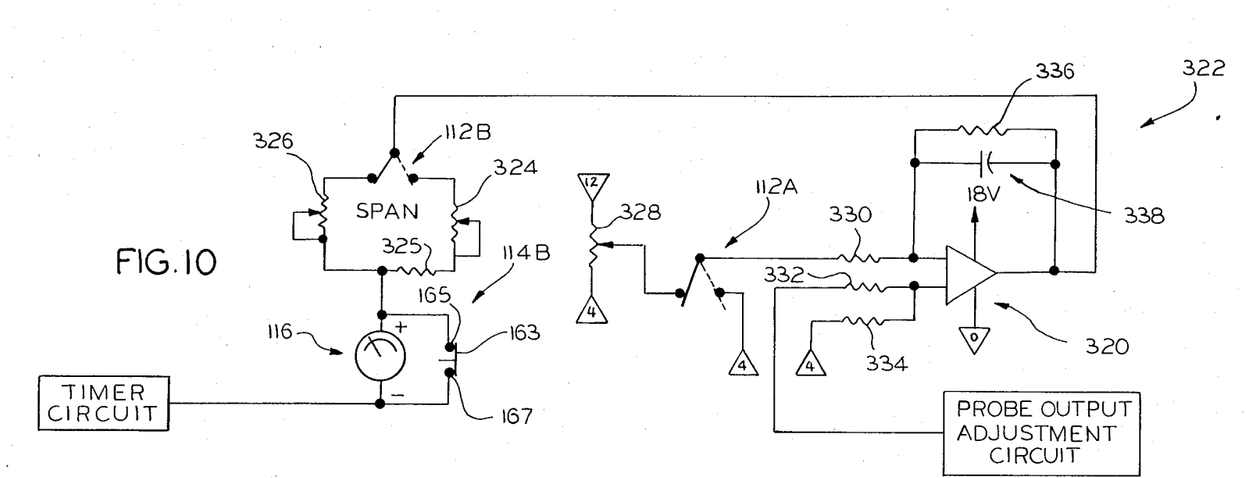
FIG. 10 illustrates a signal range switch control and measurement circuit for the readout unit.

In the full line position of switch 112A, resistor 328 is connected to the inverting input of amplifier 320, with the resistor 328 being of the same type as resistor 324 and 326 and being adjusted to provide for calibration of the instrument to read a particular value of air velocity (other than zero) with zero current flow through the meter circuiting. To achieve this, the probe is exposed to an air stream having a particular velocity, with the resistor 328 being adjusted to give a scale reading at scale 122 of zero current flow, with the velocity being 500 feet per minute in the illustrated embodiment.

In the full line showing of switch 112B in FIG. 10, this switch is in its higher range setting, and with the probe 22 disposed in an air stream having the 6,000 feet per minute maximum velocity, the resistor 326 is adjusted to provide the full scale high range reading of meter scale 122.

In the circuit 322, resistors 330, 332, 334, 336 and capacitor 338 are a part of the amplifier circuit in which amplifier 320 is involved. When the input from the range switch 112A is in the low range (the dashed line position of FIG. 10), the 4 volt reference of circuit 150 corresponds to zero feet per minute velocity. When the switch 112A is in its high line (the full range position of FIG. 10), the input is a voltage settable by adjusting resistor 328, which is set to have the voltage equal to the air velocity of 500 feet per minute.

As indicated, the output of the amplifier 320 goes to the range switch 112B, which provides for the selection of the appropriate span calibration resistor, resistor 326 for the high range (the full line showing of FIG. 10), and resistor 324 and 325 for the low range (the dashed line position of FIG. 10).

The meter 116, and specifically its indicator 124 and the relative position of same with respect to the scale 122, provides the output indicator, with the scale being calibrated for the indicated high and low ranges, namely 500 feet per minute to 6,000 feet per minute for the high range, and zero feet per minute to 600 feet per minute for the low range, respectively.

Also, as has been indicated, switch 114A (see FIG. 4) is that portion of the "push to measure" switch 114 which connects the electrical energy power source to the measurement circuitry. As indicated, switch 114A is normally open and thus its contacts are closed when the switch button 115 (see FIGS. 1 and 3) is depressed. Switch 114B (see FIG. 10) is that portion of the "push to measure" switch 114 which, in accordance with the present invention, is to provide meter movement damping when the instrument is not in use, in order to minimize damage that could be caused by shock or vibration; for this purpose, the contacts of switch 114B are closed by contactor 163 when the button 115 is released (as by providing suitable spring biasing action on button 115).

Figure 11:
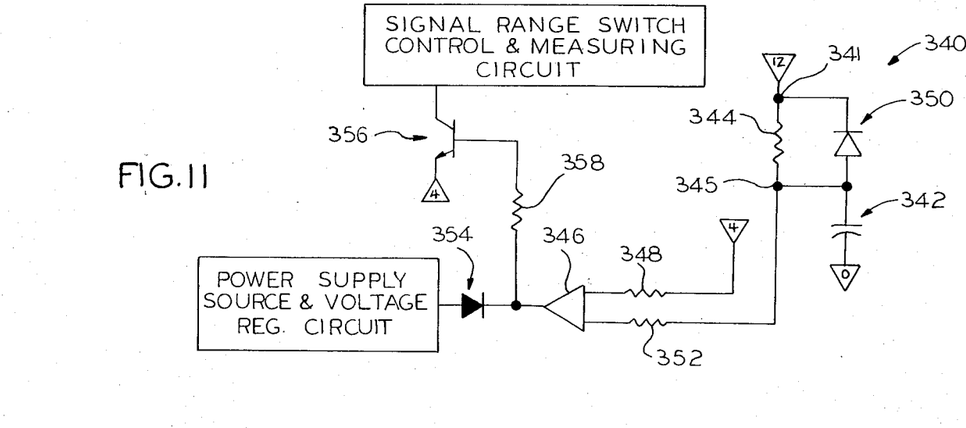
FIG. 11 illustrates a timer circuit that is employed in conjunction with the signal range switch control and measurement circuit to provide for fast warm up of the thermistor when operation of same is instituted.

Referring now to the timer circuit 340 of FIG. 11, when the instrument is turned on for air flow velocity measurement, the 12 volt sourcing direct current supply is applied to contact 341, and thus capacitor 342 begins to charge through a resistor 344 from the initial value of zero volts toward the 12 volt value. The junction of resistor 344 and capacitor 342, as at contact 345, is connected to the non-inverting input of integrated circuit amplifier 346 by way of resistor 352, while the inverting input of the amplifier 346 is connected to the 4 volt sinking voltage supply (FIG. 4) through resistor 348. The amplifier 346 acts as a comparator and its output is either high or low, depending on whether the inverting or non-inverting input is of a higher value. Initially, the output of amplifier 346 is low, and when the capacitor 342 has charged to a value slightly in excess of 4 volts, the output of amplifier 346 jumps to a high value and remains there until the instrument is shut off. When the instrument is turned off, the capacitor 342 discharges back to zero volts through diode 350 and resistor 344, as a pair, with the diode 350 allowing the capacitor 342 to discharge more rapidly than it charges, whereby if the instrument is switched on and off rapidly, the timing effect on turn on of the instrument will start with an adequately discharged capacitor 342.

The timer circuit 340 performs two important functions. Its diode 354 is connected to the contact 355 (of FIG. 4) that forms the interconnection point of resistors 196 and 197. After initial turn on, the timer, circuit output is initially in a low state; the diode 354 acts to divert current from the input of amplifier 346, and consequently holds the output of amplifier 346 down to approximately 2 volts. This allows a potential of 18 volts minus 2 volts or 16 volts to be available to the thermistor bridge circuit 214 during initial warm up, as opposed to the 18 volts minus 4 volts or 14 volts that would otherwise be available.

In addition, during the warm up period, the voltage across the thermistor bead 32 is much higher than normal, and would cause the output meter 116 to deflect harshly in excess of or beyond full scale, and then drift back to the proper level as the thermistor bead 32 reached its operating temperature. This is undesirable and to solve this problem, transistor 356 is provided in timer circuit 340, which transistor 356 is turned off by a resistor 358 during the warm up period, to not allow current flow therethrough. When the timer circuit output reaches the needed high level, transistor 356 is turned on, and current flow through meter 116 during the measurement of the air flow velocity is unaffected, and thus, as indicated, the air flow velocity measurement is made, unaffected by ambient air conditions or variations of the temperature of the air stream being measured.

It will thus be seen that the timer circuit 340 prevents the meter 116 from overranging during the thermistor warm up period. The electrical connection through diode 354 to the 4 volt current sinking voltage supply causes this voltage supply to drop down to two volts during the warm up period, which makes an extra 2 volts available across the thermistor bead for rapid heating of the thermistor during the warm up period.

In the showing of FIG. 14, many of the electronic signal processing circuitry components are shown as applied to circuit board 106, with the location of the meter 116 being indicated by the dashed line 116A. The location of the low range zero set 111, the high and low range switch 112, as the location of the apertures of the circuit board 106 to which its mounting screws 110 are applied to mount the circuit board 106 in its operating position within the casing 24. The connections of the probe sensing components to the electronic signal processing circuitry are also indicated (see also FIGS. 12 and 13).

The thermistor 32 is preferably in the form of a thermistor bead offered by Fenwal, Inc., Ashland, Mass., or its equivalent and thus comprises (see FIG. 12) bead section 370 that on application to the probe has its leads 372 and 374, respectively, suitably connected to traces 70 and 72 of circuit board 31. The thermistor 32 is Fenwal part No. GB41L2.

The solid state sensor 34 is preferably the NPN silicon temperature sensing bipolar transistor offered by Motorola Inc., Schaumburg, Ill. (Industry Standard ID No. MMBTS-102), or its equivalent. However, any temperature sensing electronic device that provides a linear output with temperature variations could be employed with appropriate circuit modifications. The specific sensor 34 indicated is preferred because of its low mass and rapid response to temperature variations. Other devices suitable for the same purpose that have slower response time are the National Semiconductor LTD LM 335 integrated temperature sensor, the Texas Instruments Inc. (Dallas, Tex.) TSF 102 silicon sensor, and the Analog Devices Inc. (Norwood, Mass.) AD 590 integrated temperature transducer. The sensors 34 contemplated by this invention and disclosed herein are not affected by air stream velocity variations because they are not self heated and dissipate essentially no heat in operation. Sensor 32 being a self heated body, velocity variations cause variations in the power required to heat same.

The integrated circuit amplifiers disclosed are preferably of the type offered by National Semiconductors Ltd., Plattburgh, N.Y., as Industry Standard ID. No. LN324N, or their equivalents. In the diagrammatic showing of FIG. 5, amplifiers 180, 190, 320, and 346 are provided by available sections of quad operational integrated circuit amplifier 380, amplifiers 172, 228 and 286 are provided by available sections of quad operational integrated circuit amplifier 382, transisters 264, 270, 308 and 312 are provided by available sections of integrated NPN transistor array integrated circuit 384, and amplifiers 260, 266, 302, and 314 are provided by available sections of quad operational integrated circuit amplifier 386, as is conventionally available for devices of this type.

The NPN transistors 264, 270, 308, and 312 are provided by available sections of the integrated circuit involved, which preferably is the National Semiconductors Ltd. NPN transistor array product offered as Industry Standard ID No. LM3046N, or their equivalents.

The quad amplifiers referred to each have four separate amplifying sections that may be used interchangeably. The choice of the section that is used is governed by physical location and how it will connect on the circuit board. Supply voltages are common to all four units and that also affects location. The NPN transistor array product referred to is likewise sectioned with five independently usable transistors distributed throughout the circuitry.

The meter 116 may be the 0–1 milliamp direct current moving magnet analog output reading meter offered by Modutec Inc., Norwalk, Conn., or its equivalent, though any suitable velocity readout device that is compatible with this disclosure may be employed for this purpose.

The batteries employed to power the instrument 20 may be any suitable 9 volt batteries, such as those offered by Eveready Model 522, Duracell MN1604, and Rayovac A1604, or their equivalents.

The probe tube aperture pairs 35 and 44, in association with the corresponding apertures 40 and 50 of probe circuit board 31, provide protection for the respective sensors 32 and 34 as well as appropriately isolating them from each other, and defining uniform location of same relative to the probe tube from instrument to instrument.

It will therefore be seen that the invention provides a thermal anemometer that provides a direct readout in terms of air flow velocity that is totally uneffected by the ambient temperature of the air stream, that has the capability of measuring air velocity over a wide range of ambient temperatures and velocities, and that provides a way of assuring zero velocity through the probe (use of cover 86) during the setting of the low range zero adjustment. Furthermore, the instrument is light weight, small, and easy to handle. The proportioning of the read out unit is fully compatible with hand holding during use, and operation of the various switches by the fingers of the hand that holds the read out unit. The probe 22 is of few and simple parts and easily handled to provide a direct but separate air flow on the respective sensors mounted in same. In the case of both the probe 22 and the read out unit 24, the components are mounted on common printed circuit boards that can be assembled and tested before being applied to their respective mounting structures. The read out unit "push to test" switch shuts off the instrument when it is not in use to conserve the batteries and extend the useful life of same, and the battery indicator 140 lets the operator know when the batteries should be replaced.

The readout unit circuitry, including the log and anti-log providing components are all mounted on the common and single readout unit substrate providing circuit board that provides an integrated circuit package that in addition to the circuitry performance described, eliminates any other effects of temperature difference among critical readout unit components.

The wrist strap 156 permits the operator to secure the read out instrument against dropping same while the operator gets in the position to measure air velocity. The probe cover 86 insures full protection of the probe sensing elements not in use.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

What is claimed is:

1. A thermal anemometer for measuring the velocity of an air stream, and comprising:
    a probe having mounted in same in spaced relation a thermistor and a solid state linear output temperature sensor,
    said probe being ported transversely across same at said thermistor and said sensor, respectively, for passage of the air flow therethrough about said thermistor and said sensor,
    a source of electrical energy,
    means for electrically operating said thermistor in a self heated mode at a constant predetermined temperature from said energy source to provide a thermistor signal in proportion to the velocity and the difference in temperature between that of the thermistor and the ambient temperature of the air stream,
    means for operating said sensor from said energy source to provide a sensor signal in proportion to the ambient temperature of the air stream,
    means for electronically combining said signals to provide a resultant signal that is in proportion to the velocity of the air stream free of effect of the ambient temperature variation of said signal of said thermistor, and
    means for reading out said resultant signal,
    said sensor comprising a transistor having a constant current flow through its base emitter junction to provide said sensor signal.

2. A thermal anemometer for measuring the velocity of an air stream, and comprising:
    a probe having mounted in same in spaced relation a thermistor and a solid state linear output temperature sensor,
    said probe being ported transversely across same at said thermistor and said sensor, respectively, for passage of the air flow therethrough about said thermistor and said sensor,
    a source of electrical energy,
    means for electrically operating said thermistor in a self heated mode at a constant predetermined temperature from said energy source to provide a thermistor signal in proportion to the velocity and the difference in temperature between that of the thermistor and the ambient temperature of the air stream,
    means for operating said sensor from said energy source to provide a sensor signal in proportion to the ambient temperature of the air stream,
    means for electronically combining said signals to provide a resultant signal that is in proportion to the velocity of the air stream free of effect of the ambient temperature variation of said signal of said thermistor, and
    means for reading out said resultant signal,
    said operating means for said thermistor, said operating means for said sensor, said electronically combining means, and said reading out means being contained in a casing separate from said probe and being electrically connected to said probe thermistor and sensor, respectively, by flexible connector means,
    said sensor comprising a transistor having a constant current flow through its base emitter junction to provide said sensor signal.

3. A thermal anemometer for measuring the velocity of an air stream, and comprising:
    a probe having mounted in same in spaced relation a thermistor and a solid state linear output temperature sensor,
    said probe being ported transversely across same at said thermistor and said sensor, respectively, for passage of the air flow therethrough about said thermistor and said sensor,
    a source of electrical energy,
    means for electrically operating said thermistor in a self heated mode at a constant predetermined temperature from said energy source to provide a thermistor signal in proportion to the velocity and the difference in temperature between that of the thermistor and the ambient temperature of the air stream,
    means for operating said sensor from said energy source to provide a sensor signal in proportion to the ambient temperature of the air stream,
    means for electronically combining said signals to provide a resultant signal that is in proportion to the velocity of the air stream free of effect of the ambient temperature variation of said signal of said thermistor, and
    means for reading out said resultant signal,
    said electronic combining means comprising circuit means for converting said thermistor signal to the equivalent of twice the logarithm of the voltage across said thermistor, circuit means for converting said sensor signal to the logarithmic equivalent of said sensor signal, circuit means for subtracting said logarithmic equivalent of said sensor signal from said logarithmic equivalent of said thermistor signal to provide a remainder signal and circuit means for providing the antilogarithmic equivalent of said remainder signal to provide said resultant signal, said means for reading out said resultant signal comprising an analog output reading meter calibrated in feet per minute, off-on switch means being interposed between said energy source and said electrically operating means for off-on energy supply control to said electrically operating means, and timer circuit means being incorporated in said means for electrically operating said thermistor for expediting warm up of said thermistor for a predetermined time after said switch means is actuated to connect said energy source to said electrically operating means.

4. A thermal anemometer for measuring the velocity of an air stream, and comprising:

a probe having mounted in same in spaced relation a thermistor and a solid state linear output temperature sensor, said probe being ported transversely across same at said thermistor and said sensor, respectively, for passage of the air flow therethrough about said thermistor and said sensor, a source of electrical energy, means for electrically operating said thermistor in a self heated mode at a constant predetermined temperature from said energy source to provide a thermistor signal in proportion to the velocity and the difference in temperature between that of the thermistor and the ambient temperature of the air stream, means for operating said sensor from said energy source to provide a sensor signal in proportion to the ambient temperature of the air stream, means for electronically combining said signals to provide a resultant signal that is in proportion to the velocity of the air stream free of effect of the ambient temperature variation of said signal of said thermistor, and means for reading out said resultant signal, said thermistor electrically operating means comprising:

a bridge circuit of which said thermistor and a resistor form one side of said bridge circuit, with said resistor having a resistance that is less than that of said thermistor in a fixed proportion when said thermistor is at said constant predetermined temperature, and with the other side of said bridge circuit comprising a first resistor and a second resistor, with said first resistor having a resistance relative to that of said second resistor that is greater by said fixed proportion, said sensor comprising a transistor having a constant current flow through its base emitter junction to provide said sensor signal.

5. A thermal anemometer for measuring the velocity of an air stream, and comprising:

a probe having mounted in same in spaced relation a thermistor and a solid state linear output temperature sensor, said probe being ported transversely across same at said thermistor and said sensor, respectively, for passage of the air flow therethrough about said thermistor and said sensor, a source of electrical energy, means for electrically operating said thermistor in a self heated mode at a constant predetermined temperature from said energy source to provide a thermistor signal in proportion to the velocity and the difference in temperature between that of the thermistor and the ambient temperature of the air stream, means for operating said sensor from said energy source to provide a sensor signal in proportion to the ambient temperature of the air stream, means for electronically combining said signals to provide a resultant signal that is in proportion to the velocity of the air stream free of effect of the ambient temperature variation of said signal of said thermistor, and means for reading out said resultant signal, said operating means for said thermistor, said operating means for said sensor, said electronically combining means, and said reading out means being contained in a casing separate from said probe and being electrically connected to said probe thermistor and sensor, respectively, by flexible connector means, said casing being of generally planar parallelepiped configuration proportioned for hand holding of same by the user, with said operating means for said thermistor, said operating means for said sensor, said electronically combining means, and said reading out means being applied to a single common printed circuit board mounted in said casing and in substantial coplanar relation with said casing, said reading out means comprising an analog output reading meter calibrated in feet per minute, said casing having a front side and an opposed rear side, with said meter read out being on said casing front side.

6. The thermal anemometer set forth in claim 5 wherein:

said probe comprises a tubular member of elongate configuration, said thermistor and said sensor being applied to a second single common printed circuit board mounted in said tubular member to extend longitudinally of same, said second circuit board being apertured in alignment with said probe porting, with said thermistor and said sensor being respectively mounted in the respective apertures of said probe circuit board.

7. The thermal anemometer set forth in claim 6 wherein:

said flexible connector means comprises a self coiling cable.

* * * * *